United States Patent Office 2,819,221
Patented Jan. 7, 1958

2,819,221

PROCESS FOR BREAKING PETROLEUM EMULSIONS EMPLOYING CERTAIN CARBOXYBUTANE ESTERS

Alvin Howard Smith, Glendale, Mo., assignor to Petrolite Corporation, Wilmington, Del., a corporation of Delaware No Drawing. Application August 6, 1954
Serial No. 448,387

5 Claims. (Cl. 252—340)

This invention relates to processes or procedures particularly adapted for preventing, breaking or resolving emulsions of the water-in-oil type, and particularly petroleum emulsions.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities particularly inorganic salts, from pipeline oil.

More specifically then, the present invention is concerned with a process for breaking petroleum emulsions of the water-in-oil type characterized by subjecting the emulsion to the action of a demulsifier including an ester or ester mixture produced from certain diols in combination with two different types of polycarboxy acids. The diol employed is a polypropylene glycol having an average molecular weight within the range of approximately 1600 to 2700. The preferred polypropylene glycol is one having a molecular weight of approximately 2000. For reasons which are well known, such a product is not a single glycol, but represents a mixture in which the molecular weight designation is in reality the average molecular weight of the mixture. However, this is the usual and conventional method of describing such polypropylene glycols.

The two acids employed are diglycolic acid and butane 1:2:3:4-tetracarboxylic acid, commonly referred to as tetracarboxy butane.

The molal ratio of reactants are 1:4:4 in which the "1" represents tetracarboxy butane.

Manufacture of the herein described demulsifying agent is comparatively simple. In one procedure, tetracarboxy butane acid is simply esterified by any conventional means with 4 moles of polypropylene glycol with the elimination of water so as to yield a product which for the most part corresponds to the following formula

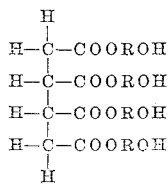

in which R is the polypropylene glycol residue.

The hydroxylated ester thus obtained is then reacted with 4 moles of diglycolic acid so as to convert the hydroxylated ester into a more complicated acidic ester characterized for the most part by 4 free carboxyl radicals.

In an idealized form, such final product would be characterized by the following formula

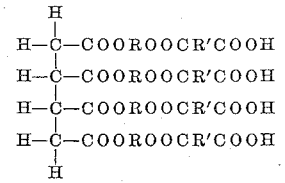

in which the characters have their previous significance and R' represents the diglycolic acid residue.

What is said previously must be evaluated in light of esterification reactions of the kind employed to produce polyester or alkyd resins and the like. This means that when one mole of tetracarboxy butane is reacted with 4 moles of polypropylene glycol one does not obtain exclusively a compound of the kind described above, but rather a mixture in which the above may be the principal or major component, but there are also present certain other derivatives as for example, fractional esters having one or more carboxyl radicals and one or more hydroxyl radicals.

What has been said previously applies with even greater force and effect when such reaction mass as previously described derived from one mole of tetracarboxy butane and 4 moles of polypropylene glycol is reacted further with 4 moles of diglycolic acid. The same limitation applies as when one attempts to obtain the first stage product of reaction. Not only is that true, but additional reactions corresponding to esters in linear polymers, and also cross esterification, may take place so that actually the reaction mass is more complicated than has been indicated by the idealized formula noted above. For this reason the product obtained is best described by the process by which it is derived from the above noted reactants in the ratios stated. Broadly speaking, one can employ either a single-step process in which all the ingredients are combined at one time or a two-step process as previously suggested.

An obvious variant of the two-step process is to esterify 4 moles of the polypropylene glycol with 4 moles of diglycolic acid and when the esterification is complete add one mole of tetracarboxy butane and proceed with the second step.

Since the acids employed are strongly acidic the reaction goes satisfactorily without any catalyst although any one of a number of conventional catalysts employed to promote this type of reaction may be used. These include, among others, acids such as toluene sulfonic acid, ethane sulfonic acid, dry hydrochloric acid gas, etc. The reaction is also accelerated when employing an inert gas such as dried nitrogen. Methods of preparing this class of products are illustrated by the following examples.

EXAMPLE 1a

About 30.0 pounds of a glycol having an average molecular weight of 1600 was charged into an esterification pot. This pot was a closed vessel made of 316 stainless steel, having cooling and heating coils, an agitator, a thermometer, and a condenser for disposing of water and returning solvent reflux. 1.1 pounds of tetracarboxybutane and 2.51 pounds of diglycolic acid were added. No solvent was used in this case. The mixture was heated to 160° C. and held there for four hours, with constant stirring. During this period, 0.6 pound of water were removed via the condenser. The product was a viscous, dark amber fluid, containing a few specks of white sediment.

In a similar procedure dried nitrogen gas was passed through the mixture slowly with the only difference that there was, of course, no water condensed. The same procedure has also been followed using a solvent such as an aromatic petroleum solvent or a mixture of xylene and cymene. In such procedure a phase separating trap was employed in connection with the condenser and the water carried over and collected in the trap. Using this type of procedure the solvent was permitted to remain in the product in some instances and in other instances was removed by vacuum distillation. In some instances a small amount of toluene sulfonic acid was employed as a catalyst along with a solvent.

EXAMPLE 9a 37.7 pounds of polypropylene glycol 1700 were charged into the above mentioned pot. 2.81 pounds of diglycolic acid was added and the batch held at 160° C. for four hours. During this time 0.75 pound of water evolved about the theoretical amount expected if all the glycol reacted. The batch was then cooled back to about 60° C. to allow addition of 1.23 pounds of tetracarboxy butane. The batch was then held at 170° C. for four more hours. Only a trace of water came off, and it was assumed that transesterification had occurred between the glycol ester and the tetracarboxy butane.

EXAMPLE 12a 1.34 pounds of tetracarboxy butane and 48.0 pounds of polypropylene glycol 2100 were heated together at 165° C. for about four and one-half hours. 11.2 pounds of solvent had been added to facilitate agitation and removal of water. About 0.5 pound of water was evolved. The batch was cooled to allow addition of 3.06 pounds of diglycolic acid, and then held at 180° C. for four hours. 0.36 pound of water evolved, indicating completion of the reaction by transesterification and also direct esterification. These Examples 1a, 9a, and 12a along with additional examples appear in Tables I, II, and III following.

Table I

| Ex. No. | Tetra-carboxy-Butane, lbs. | Polypropylene Glycol | | Diglycolic acid, lbs. | Mol. Ratio, TCB: Glycol: Diglycolic | Solvent Xylene |
|---|---|---|---|---|---|---|
| | | Molecular Weight | Pounds | | | |
| 1a | 1.1 | 1,600 | 30.0 | 2.51 | 1:4:4 | |
| 2a | 1.16 | 1,800 | 35.7 | 2.65 | 1:4:4 | |
| 3a | 1.02 | 1,900 | 33.1 | 2.34 | 1:4:4 | 8.5 |
| 4a | 1.16 | 2,000 | 40.0 | 2.68 | 1:4:4 | 10.0 |
| 5a | 1.34 | 2,100 | 48.0 | 3.06 | 1:4:4 | 11.2 |
| 6a | 1.04 | 2,300 | 41.2 | 2.40 | 1:4:4 | 10.5 |
| 7a | 0.83 | 2,500 | 35.3 | 1.90 | 1:4:4 | 9.2 |
| 8a | 0.91 | 2,700 | 42.0 | 2.08 | 1:4:4 | 10.7 |
| 9a | 1.23 | 1,700 | 35.7 | 2.81 | 1:4:4 | |
| 10a | 1.02 | 1,900 | 33.1 | 2.34 | 1:4:4 | 8.5 |
| 11a | 1.16 | 2,000 | 40.0 | 2.68 | 1:4:4 | 10.0 |
| 12a | 1.34 | 2,100 | 48.0 | 3.06 | 1:4:4 | 11.2 |
| 13a | 1.1 | 2,200 | 41.5 | 2.53 | 1:4:4 | |
| 14a | 1.0 | 2,400 | 41.5 | 2.32 | 1:4:4 | |
| 15a | 0.9 | 2,600 | 40.0 | 2.06 | 1:4:4 | |
| 16a | 0.91 | 2,700 | 42.0 | 2.08 | 1:4:4 | 10.7 |

Table II.—Single step esterification

| Ex. No. | Temp., ° C. | Time, hrs. | Water Evolved, lbs. | Para-toluene sulfonic acid catalyst, lbs. |
|---|---|---|---|---|
| 1a | 160 | 4 | 0.6 | |
| 2a | 160 | 4 | 0.75 | |
| 3a | 170 | 4 | 0.61 | |
| 4a | 175 | 4.5 | 0.72 | |
| 5a | 175 | 4.5 | 0.86 | |
| 6a | 175 | 5.0 | 0.63 | 0.1 |
| 7a | 180 | 5.0 | 0.55 | 0.1 |
| 8a | 180 | 5.5 | 0.57 | 0.1 |

Table III.—Two-step esterification

| Ex. No. | 1st Step | | | 2nd Step | | | Para-toluene sulfonic acid catalyst, lbs. | Acid added first to glycol |
|---|---|---|---|---|---|---|---|---|
| | Temp., ° C. | Time, hrs. | Water Ev., lbs. | Temp., ° C. | Time, hrs. | Water Ev., lbs. | | |
| 9a | 160 | 4.0 | 0.75 | 170 | 4.0 | 0.03 | | Diglycolic. |
| 10a | 160 | 4.5 | 0.61 | 170 | 4.0 | | | Do. |
| 11a | 165 | 4.5 | 0.70 | 175 | 4.5 | 0.02 | | Do. |
| 12a | 165 | 4.5 | 0.50 | 180 | 4.0 | 0.36 | | TCB. |
| 13a | 170 | 6.0 | 0.45 | 180 | 4.5 | 0.23 | | TCB. |
| 14a | 170 | 6.0 | 0.62 | 180 | 5.0 | | 0.1 | Diglycolic. |
| 15a | 175 | 6.0 | 0.51 | 180 | 5.5 | 0.04 | 0.1 | Do. |
| 16a | 180 | 5.5 | 0.50 | 180 | 5.5 | 0.07 | 0.1 | Do. |

Insofar that the products used, and particularly the tetracarboxy butane, are products of technical purity only it is obvious that reference to molecular weight ratio is approximate and may vary within a reasonable degree one way or the other. For this reason in the hereto attached claims reference is made to the approximate ratio of 1:4:4. The completeness of reaction can be checked by the elimination through reaction of approximately two-thirds of the carboxyl radicals and approximately all of the hydroxyl radicals or by a saponification number or as previously suggested by the amount of water eliminated.

Molecular weight is also an approximate index as to completeness of reaction. Any obvious equivalent of tetracarboxy butane may be employed. For example, I have prepared methyl and ethyl esters and used such esters in preparing the herein described products with the elimination of methyl or ethyl alcohol instead of water. One could also employ, if available, anhydrides of tetracarboxy butane (either inter-molecular or intra-molecular). This also would be true of the acyl chlorides. Methyl or ethyl esters are of interest primarily for the reason that fractional distillation yields a comparatively pure ester from the technical grade of tetracarboxy butane.

As to the use of conventional demulsifying agents, reference is made to U. S. Patent No. 2,626,929, dated January 7, 1953, to De Groote, and particularly to Part Three. Everything that appears therein applies with equal force and effect to the instant process, noting only that where reference is made to Example 13b in said text beginning in column 15 and ending in column 18, reference should be to Example 4a, herein described.

Another use for the esters herein described is in connection with the clarification of used lubricating oils. Lubricating oils fall into two general classes; one being lubricating oil to which additives such as detersives have been added. The other class represents a so-called straight hydrocarbon oil such as those exemplified by lubricating oils derived from Pennsylvania grade crude oil. Such used non-additive type lubricating oils are reclaimed by a process which is essentially (1) filtration, (2) treatment with an alkali or sodium silicate, (3) a second filtration step, and finally distillation to remove volatile matter and bleaching by means of filtering earths or chars.

I have found that if a small amount of the esters of the kind herein described, for instance for as little as 1/10 of 1% is added to the oil in the initial step and the product heated to approximately 125° C. for two hours and then filtered the product becomes very clear in many instances and the final bleaching step can be avoided.

I have found that the chemical compounds or reagents herein described, which are particularly desirable for use as demulsifiers, may also be used as a break inducer in doctor treatment of the kind intended to sweeten gasoline. See U. S. Patent No. 2,157,223, dated May 9, 1939, to Sutton.

Having thus described my invention, what I claim as new and desire to obtain by Letters Patent, is:

1. The process of breaking petroleum emulsions of the water-in-oil type characterized by subjecting the emulsion to a demulsifying agent including an esterified cogeneric mixture obtained by a process including the step of esterifying a polypropyleneglycol having an average molecular weight of at least 1600 and not over 2700 with diglycolic acid and tetracarboxy butane acid; the molal ratio of reactants being one part of tetracarboxy butane to four parts each of polypropylene glycol and diglycolic acid; said reaction being conducted at a temperature sufficiently high to evolve water and below the pyrolysis point of reactants and reaction product with the elimination through reaction of approximately two-thirds of the carboxyl radicals present and substantially all the hydroxyl radicals present.

2. The process of breaking petroleum emulsions of the water-in-oil type characterized by subjecting the emulsion to a demulsifying agent including an esterfied cogeneric mixture obtained by a process including the step of esterifying a polypropyleneglycol having an average molecular weight of at least 1800 and not over 2200 with diglycolic acid and tetracarboxy butane acid; the molal ratio of reactants being one part of tetracarboxy butane to four parts each of polypropylene glycol and diglycolic acid; said reaction being conducted at a temperature sufficiently high to evolve water and below the pyrolysis point of reactants and reaction product with the elimination through reaction of approximately two-thirds of the carboxyl radicals present and substantially all the hydroxyl radicals present.

3. The process of breaking petroleum emulsions of the water-in-oil type characterized by subjecting the emulsion to a demulsifying agent including an esterified cogeneric mixture obtained by a process including the step of esterifying a polypropyleneglycol having an average molecular weight of about 2000 with diglycolic acid and tetracarboxy butane acid; the molal ratio of reactants being one part of tetracarboxy butane to four parts each of polypropylene glycol and diglycolic acid; said reaction being conducted at a temperature sufficiently high to evolve water and below the pyrolysis point of reactants and reaction product with the elimination through reaction of approximately two-thirds of the carboxyl radicals present and substantially all the hydroxyl radicals present.

4. The process of claim 3 with the proviso that the procedure is conducted as a one-step process.

5. The process of claim 3 with the proviso that the procedure is conducted as a one-step process in absence of any added catalyst.

References Cited in the file of this patent

UNITED STATES PATENTS

| | | |
|---|---|---|
| 2,295,165 | De Groote et al. | Sept. 8, 1942 |
| 2,379,251 | Muskat et al. | June 26, 1945 |
| 2,401,966 | Salathiel | June 11, 1946 |
| 2,499,392 | Kenyon et al. | Mar. 7, 1950 |
| 2,562,878 | Blair | Aug. 7, 1951 |
| 2,597,204 | Todd et al. | May 20, 1952 |
| 2,695,914 | De Groote | Nov. 30, 1954 |